June 30, 1959

E. L. HUGHES

TELEVISION SECRECY SYSTEM WITH WIDTH MODULATED SYNCHRONIZING PULSES 2,892,882

Filed Feb. 21, 1955

3 Sheets-Sheet 1

INVENTOR.
EDWIN L. HUGHES
BY Lyon & Lyon
ATTORNEY

INVENTOR.
EDWIN L. HUGHES
BY Lyon & Lyon
ATTORNEYS

June 30, 1959

E. L. HUGHES

TELEVISION SECRECY SYSTEM WITH WIDTH MODULATED SYNCHRONIZING PULSES 2,892,882

Filed Feb. 21, 1955

3 Sheets-Sheet 3

INVENTOR.
EDWIN L. HUGHES
BY Lyon & Lyon
ATTORNEYS 2,892,882

TELEVISION SECRECY SYSTEM WITH WIDTH MODULATED SYNCHRONIZING PULSES

Edwin L. Hughes, Sepulveda, Calif., assignor, by mesne assignments, to Paramount Pictures Corporation, New York, N.Y., a corporation of New York Application February 21, 1955, Serial No. 489,629

5 Claims. (Cl. 178—5.1)

This invention relates to television systems, and, more particularly, to an arrangement for transmitting additional information in a television system.

In an application to Robert E. Gottfried et al. for Prepaid Entertainment Distribution System, filed May 10, 1951, Serial Number 225,651, issued October 30, 1956, as Patent No. 2,769,026, there is described an arrangement whereby a television program is scrambled and then transmitted. Receivers which belong to subscribers to the subscription television system are equipped with coinboxes. Information is transmitted along with the scrambled program which is indicative of the price demanded, in order that this program may be seen. This price is indicated by the coinboxes in the subscribers' receivers. Upon payment into the coinbox of the demanded sum, the receiver is permitted to decode the scrambled broadcast and present it intelligibly. Other subscription television systems have been described in the literature which use different arrangements for collecting the price of a program. The systems, however, all have the common problem of transmitting additional information within the limitations of the bandwidths prescribed by the Federal Communications Commission. This additional information may consist of price signals, program-identification signals, and also coded keying signals for the purpose of enabling the decoding of the scrambled transmission at the receiver.

Various solutions for transmitting this additional information have been made. One is to use an auxiliary R.F. channel, or a land line. Another is to have the decoding either printed on a card or perforated therein, which card is periodically purchased and inserted in a proper holder in an attachment for the television set. The more desirable system, of course, is to eliminate the necessity for these separate channels and to transmit the keying code within the bandwidths provided for a television normal channel. To this end, the transmission of supersonic pulses representative of the information desired to be conveyed has been employed. This arrangement is described in the above patent to Gottfried et al.

Other scrambling systems have used what may be called self-keying signals, whereby the transmission itself provides wave shapes which may be detected with the proper networks, and the outputs of these networks may be employed to operate an unscrambling system.

An object of this invention is to provide an improved arrangement for transmitting additional information within the allotted transmission band of a television channel.

Another object of the present invention is to provide an additional transmission channel within the television bandwidth which does not cause interference with the remaining components being transmitted.

Still another object of the present invention is to provide a novel transmission arrangement and arrangement for reception of such transmission.

Yet another object of the present invention is the provision of a system whereby additional information may be transmitted with a television transmission which need not be related to any of the components of such transmission.

These and other objects of the invention are achieved in an arrangement whereby the horizontal synchronizing signals may be modulated to have either of two pulse widths. These, thus, may represent a "1" or a "0" in a binary code. Thus, by pulse-width modulating the horizontal-sync signals in accordance with information which has been binary coded, this information may be transmitted along with the other components of the television transmission without increasing the bandwidth requirement and without interference with any of the other components. The receiver for such transmission merely requires a pulse-width discriminator and a decoding circuit to convert the binary digits detected by the discriminator into the binary code representative of the information being transmitted. The invention will be described as being used with a subscription television system. This should not be construed as a limitation upon its use, since it will become readily apparent that information may be transmitted which is related to other components in the transmission.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
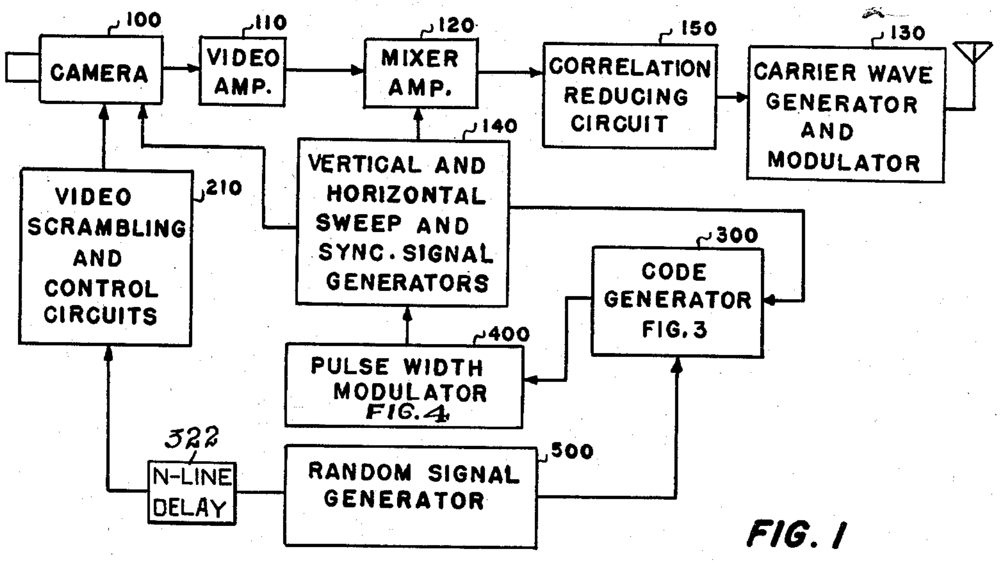
Figure 1 is a block diagram of the embodiment of the invention in a transmitter.

Referring now to Figure 1, a transmitter modified in accordance with this invention is shown therein in block-diagram form. A conventional television camera 100 includes the usual picture-to-video signal apparatus. The output of the camera is applied to a video amplifier 110, which has its output applied to a mixer amplifier 120. This mixer is the conventional arrangement for combining a video signal with the synchronizing signals which are received from a vertical and horizontal sweep and synchronizing generator 140. This generator also applies the vertical and horizontal deflection signals to the camera. The output of the mixer amplifier is applied to a correlation reducing circuit 150. This is an arrangement which is described and claimed in an application for patent by William F. Gunning for Coding Methods and System, Serial No. 579,973, filed April 23, 1956, which is assigned to a common assignee. It serves to reduce the possibility of decoding a scrambled program by detecting discontinuities which are generated when a video program is changed from the conventional video transmission to scrambled video transmission. Unauthorized receivers may detect these discontinuities and employ them for the purpose of unscrambling the transmission. The output of the correlation reducing circuit is applied to a carrier-wave generator and modulator 130. This consists of the well-known arrangement for modulating the complete video signal upon a carrier, which is then radiated.

A random-signal generator 500 consists of an arrangement for providing pulses at pseudorandom times. Such generators are well known in the art and need not be further described here. The output of the random-signal generator is applied to a code generator 300. This is an arrangement for generating a binary number representative of a keying code. The random-signal generator output is also applied to a video scrambling and control circuit arrangement 210. The random pulse energizes the scrambling and control circuits to cause the video signal to be scrambled or render it unintelligible in the absence of suitable unscrambling apparatus. The code generator simultaneously generates the binary number representative of the key code.

The scrambling function may take a number of forms. It may "scramble" the picture, for example, by obscuring the occurence of a single important event, such as the vertical synchronizing pulse. In such a case, the code generator provides a signal which, when properly decoded, indicates the occurrence of this event. Or, the picture may be "scrambled" by alternately putting the picture into one of two (or more) possible states, such as delayed and undelayed with respect to the horizontal synchronizing signals, or such as positive and negative polarity of the video modulation. In these cases, the code generator provides a signal which indicates the new state of the picture which is about to commence.

Since only one binary digit may be transmitted on each horizontal pulse, it will take N-line times to transmit the code to the receiver. It is necessary, therefore, to introduce an N-line delay between the random-signal generator of Figure 1 and the scrambling and control circuits, in order that the scrambling/unscrambling actions will be taken simultaneously at the transmitter and receiver.

The output of the code generator is applied to a pulse-width modulator 400, which alters the width of the horizontal-sync pulses which are employed to synchronize the beginning of the lines of a television picture. The pulse-width modulator causes the horizontal-sync pulses to have either of two pulse widths, which are representative of the binary "1" and binary "0." The binary number which is generated by the code generator, accordingly, causes the pulse-width modulator to vary the width of the horizontal-sync pulses to be representative of the binary number, and thus a serial arrangement of the binary number is transmitted from the television transmitter along with the other information in the transmission. Any suitable pulse-width modulator may be employed; however, a desired arrangement is shown and described later herein.

The video scrambling and control circuits may be any suitable arrangement for scrambling the camera video signals. One such may be found described and claimed in an application by this inventor which is entitled Vertical Rolling Scrambling, filed March 9, 1955, Serial No. 493,259, and assigned to a common assignee, now abandoned.

Figure 2:
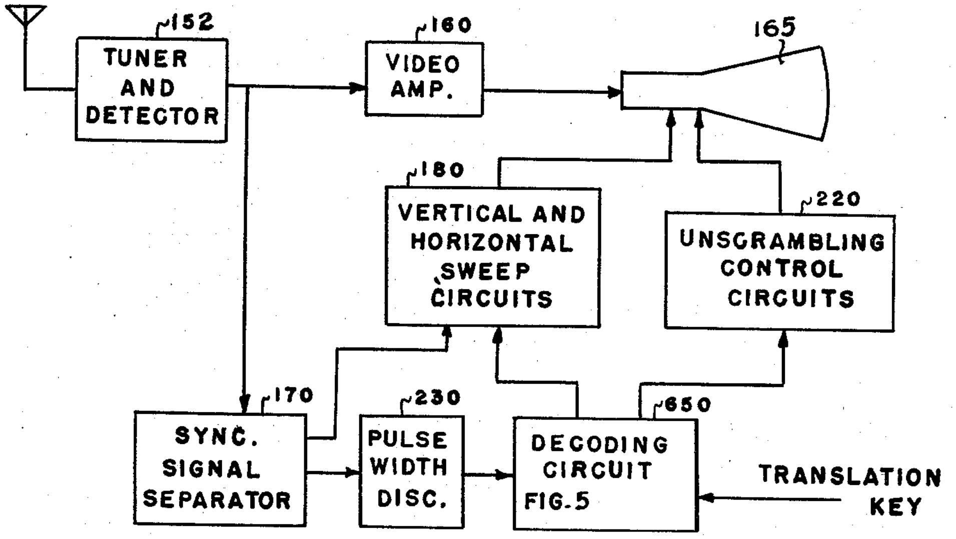
Figure 2 is a block diagram of the embodiment of the invention in a receiver.

Referring now to Figure 2, there is shown a block diagram of a receiver which is modified in accordance with this invention. This receiver has the usual tuner and detector 152, the output from which is applied to a video amplifier 160. The output of the video amplifier is applied to the cathode-ray device 165, where it is displayed. The tuner and detector output are also applied to a sync-signal separator 170, which performs the conventional operation of separating the sync signals from the composite video signal. The sync-signal separator output is applied to a pulse-width discriminator, which operates to provide an output or not, depending upon the widths of the horizontal-sync pulses which are applied to its input. This pulse-width discriminator is well known in the art and a suitable arrangement may be found described and shown, for example, in an application for a Pulse-Width Discriminator Circuit, by Edwin L. Hughes and Harold B. Rose, filed February 21, 1955, Serial No. 489,630, and issued now as Patent No. 2,737,584.

The output of the pulse-width discriminator is applied to a decoding circuit which is an arrangement for recognizing when the train of pulses from the discriminator for the binary number indicative of the fact that a scrambling operation has occurred. The output of the decoding circuit is employed to control unscrambing control circuits 220, which serve the function of unscrambling the video being displayed on the cathode-ray tube. The vertical and horizontal sweep-circuit generators 180 for the system may obtain their signals from the sync-signal generator in the conventional manner and supply the deflection signals to the cathode-ray tube. In the "vertical-rolling" method of scrambling, as described in the above-noted application for Vertical Rolling Scrambling, one of the outputs from the decoding circuit of Figure 2 may provide the vertical synchronizing signal required for unscrambling.

The conventional circuits required for operation of the television transmitter and television receiver other than those shown may be found described in a text such as Television Engineering, by Donald G. Fink, published in 1952 by the McGraw-Hill Book Company, Inc. In order to simplify the drawings, a great number of these circuits have been omitted from the description. However, this will be understood by those skilled in the art, since the conventional circuits shown are only those required in order to properly orient the connection of the invention into the transmitter and receiver.

It has been found that pulse-widths varying between three and five miscroseconds or between five and seven microseconds have been successfully employed without any perceptible alterations in the operation of the television receivers with which the system herein shown was employed. As previously pointed out, the embodiment of the invention, namely, the pulse-width modulation of the horizontal-sync pulses for transmitting additional information, is described in connection with the transmission of a subscription television program and the reception thereof. This should not be held to be a limitation on the operation of the invention, but merely an exemplification of its utility.

Figure 3:
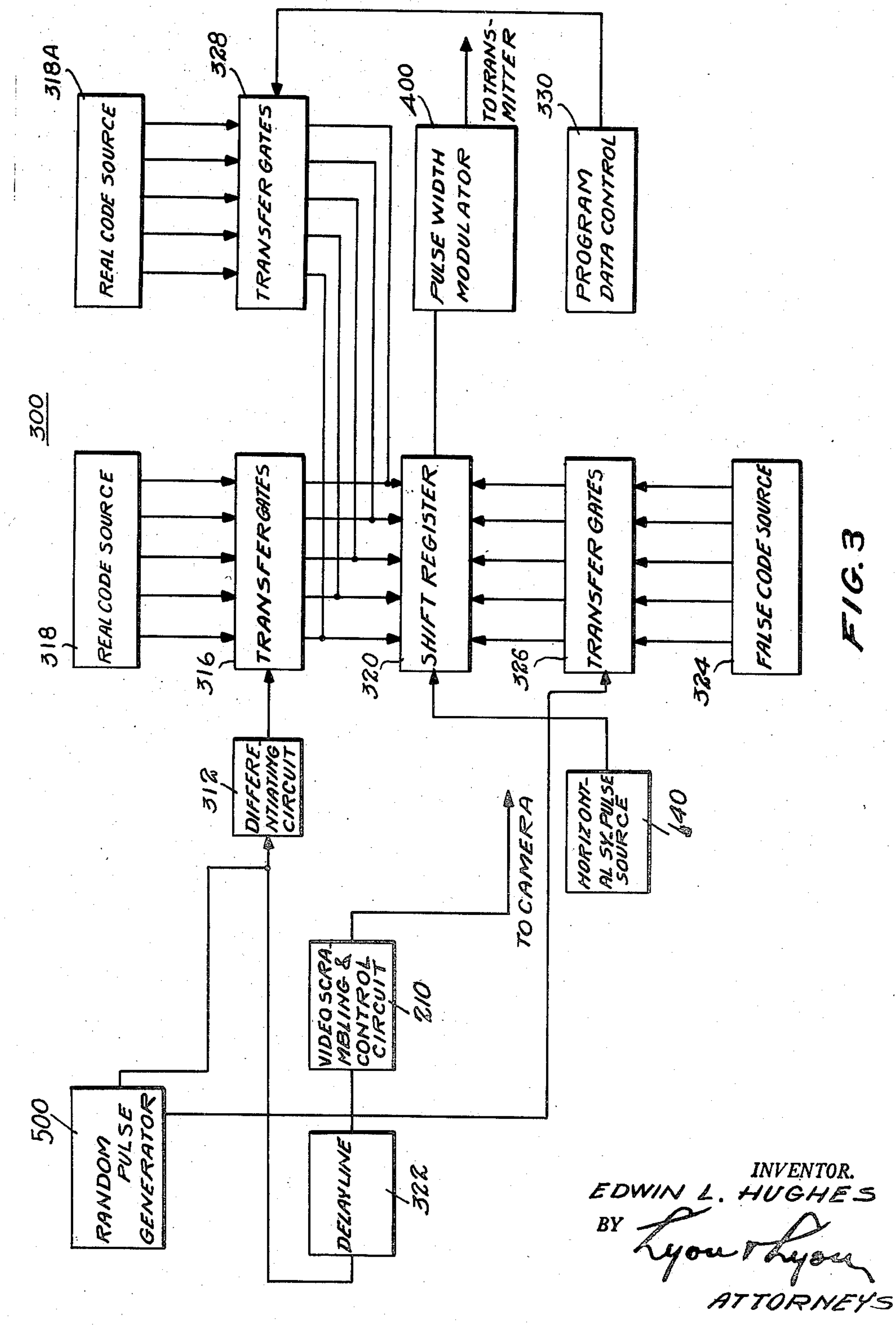
Figure 3 is a block diagram of a code generator in accordance with this invention.

Reference is now made to Figure 3, which shows a block diagram of a code generator 300, such as is represented in Figure 1. The output of the random-pulse generator 500 is applied to a multiplicity of transfer gates 316, which have applied as their other inputs signals from what may be termed a real-code source 318. This real-code source may comprise an arrangement of switches or relays which are established in a condition so that the voltage pattern provided by their output represents the desired binary code number which is indicative of the occurrence of the scrambling function. The output of the transfer gates is applied to a shift register 320. This comprises a chain of flip-flops which represents information or a binary number by the condition of the various flip-flops of which it is composed. A shift pulse is applied to all the flip-flops with the result that the condition of each flip-flop is shifted to the succeeding flip-flop, which also shifts its condition to the flip-flop following it. A shift register is well known and may be found described in the book High-Speed Computing Devices, by Engineering Research Associates, Inc., published by the McGraw-Hill Book Company. A shift register is also referred to as a stepping register and is shown, for example, in a patent to Harper, No. 2,580,771. In the present instance, the shift pulses for the shift register are obtained from the horizontal-sync-pulse generator. Accordingly, it may be seen from the portion of the circuit described thus far that, upon the occurrence of a random pulse from the generator 500, the transfer gates 316 transfer the code indicative of a scrambling function into the shift register. The shift register is driven to the horizontal-sync-pulse rate by the horizontal-sync pulses from the source 140 for the transmitter.

Figure 4:
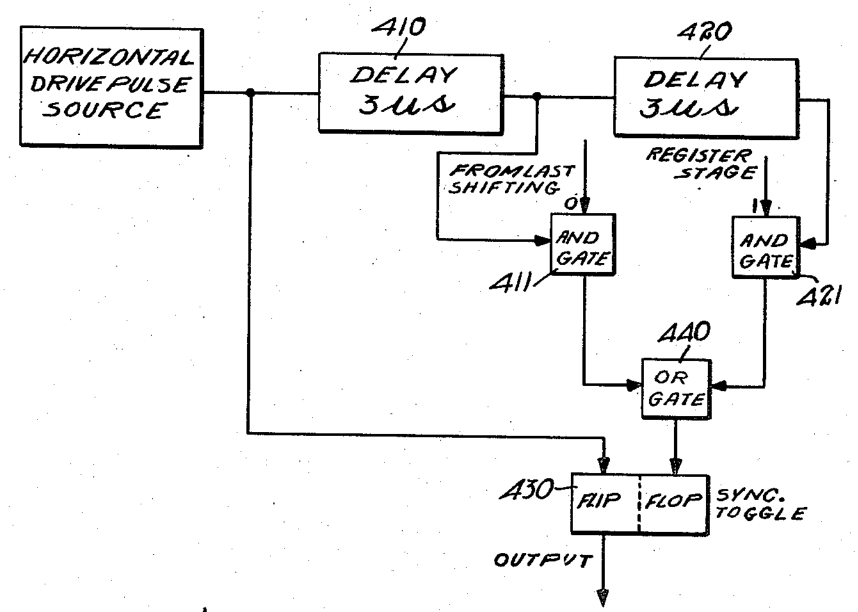
Figure 4 is a block diagram of a pulse-width modulator which may be employed to modulate the width of horizontal-sync pulses.

The output of the shift register is taken serially and applied to a pulse-width modulator 400, which is shown and described in detail in Figure 4. Thus, the horizontal-sync pulses are width modulated serially to represent the key code being stepped out of the shift register. It will be appreciated that time is required for the key code to be stepped out of the pulse-width modulator and, therefore, the commencement of the scrambling function cannot occur until the complete key code has been transmitted. This requires a delay which is equivalent to the time required for the shift register to transfer out the code. The pulse from the random generator is accordingly also applied to a delay line 322, whose delay is equivalent to the time required to transfer out the code from the shift register. Thus, at the conclusion of such transfer, the video scrambling action is permitted to occur.

Should only the key code be transmitted, it would be quite simple for an unauthorized receiver to be converted to detect the scrambling function. In order to prevent such eventuality, a false-code generator 324 is employed, as well as a duplicate set of transfer gates 326. This serves the function of entering a false, or deceptive, code into the shift register. The false-code transfer gates 326 are actuated by a second output from the random-pulse generator. This output must be isolated in time from the output which signals the real-code time. Supplemental information may be transmitted by using the other code source 318A, which are coupled to the other transfer gates 328. The other transfer gates 328 inputs may be obtained from other sources, such as a program-data control 330 which transmits data to be recorded at a receiver. It thus may be seen that the random-pulse generator or other control-pulse source may be employed to convert a binary code number representative of desired information into serial form by entry thereof into the shift register, the output of which is received successively by a pulse-width modulator at a rate determined by the horizontal-synchronizing pulse frequency.

Reference is now made to Figure 4, where there may be seen a block diagram of a suitable horizontal pulse-width modulator. Horizontal-drive pulses are received and applied to a delay circuit 410 and to the "set" input of a flip-flop circuit 430, which may also be designated as a sync toggle. Output from the sync toggle is taken from the set, or "1," side of the flip-flop. Output from the delay line 410 is applied to a second delay line 420, as well as to an And gate 411. The output from the delay line 420 is applied to another And gate 421. The second inputs to the And gates 411 and 421 are both taken from the *n*th, or last, stage of the shifting register. The input to And gate 411 is from the "0" side of the last shifting-register stage, and the input to And gate 421 is from the "1" side of the last shifting-register stage. Both And gate outputs are applied to an Or gate 440, which has its output applied to the "0," or reset, side of the sync toggle. An Or gate is a circuit which provides an output when either of its inputs is excited. It is also known as a buffer stage and may be found described in the above-noted book High-Speed Computing Devices.

In operation, a horizontal-drive pulse and an output from the shifting register are simultaneously received by the respective circuits in view of the fact that the shift register shifts only upon the application of a horizontal-drive pulse. An output from the last shifting-register stage is either a "1" or a "0." If a "0," And gate 411 is actuated as soon as the horizontal-drive pulse has passed through the first delay 410. The first delay can be made to have a duration of, for example, three microseconds. Thus, the sync toggle provides an output having a duration of three microseconds. If the last shifting-register stage output is a "1," then the And gate 421 provides an output as soon as the horizontal-drive pulse has passed through the second delay 420, which has a delay of, for example, four microseconds. Thus, the sync toggle output will have a duration of seven microseconds. It has thus been shown how width modulation of the horizontal-sync pulses is achieved, the narrow pulse being taken to represent a "0" and the wide pulse being taken to represent a "1." Of course, this arrangement may be reversed and the delay times may be altered within the limitation that the minimum energy content of the horizontal-sync pulse which is transmitted must be sufficient to operate the sync circuits in those receivers which have circuits which correct for horizontal-sync oscillator stability, or noise, by comparing the generated horizontal pulses with the incoming horizontal-sync pulses.

Figure 5:
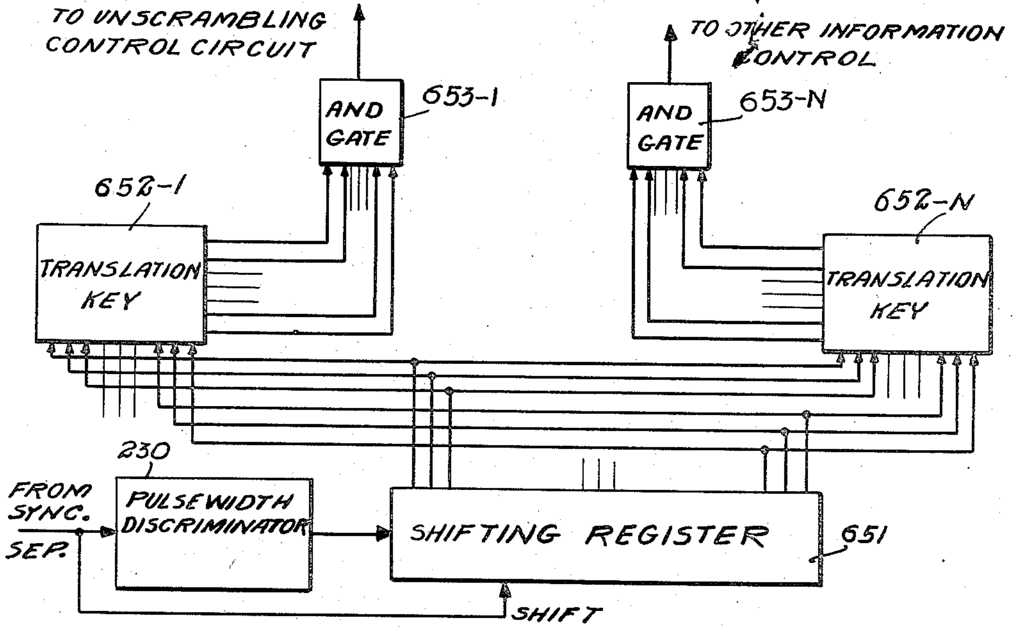
Figure 5 is a block diagram of a decoding circuit which may be employed in accordance with this invention.

Figure 5 is a block diagram of a suitable decoding circuit for employment in the receiver. The received video composite signal at the receiver has the sync signals separated therefrom in well-known manner by a sync-separating circuit which operates by amplifying only those signals exceeding the black level of the composite video picture. The sync signals are then applied to a pulse-width discriminator 230. The pulse-width discriminator may take any well-known arrangement which has as an output a pulse for the received wide pulse and no pulse for the narrow pulse. A suitable arrangement is described in the previously mentioned application for a Pulse-Width Discriminator Circuit by Edwin L. Hughes et al. The output of the pulse-width discriminator is applied to a shifting register of the same type as is employed in the transmitter. The shift pulses for the shifting register are obtained from the received horizontal-sync pulses. Accordingly, the input to the shifting register is the binary code number represented by the width-modulated horizontal-sync pulses.

A translation key 652–1 is connected to the various shifting-register stages in order to sample the outputs. This translation key may be an arrangement of transfer gates, of the same type as were described previously in the transmitter, wherein they are made to conduct simultaneously only when the voltage pattern of the output from the shifting register is the same as the one for which the various gates of the translation key are arranged to detect. The output of all the translation-key gates are applied to an And gate and, as previously described, this And gate provides an output only upon the simultaneous presence of all of its inputs. The translation key may consist of a group of cathode-follower tubes which are selectively connected to the stages of the shifting register whereby all of these cathode-follower tubes will conduct simultaneously only when the number in the shifting register provides an output-voltage pattern which biases all of the selectively connected cathode followers to conduction. When all these cathode-followers simultaneously conduct, then and only then does the And gate 653–1 provide an output which actuates the unscrambling control circuits 220.

Other information which has been transmitted by the width modulation of the horizontal-sync pulses may be detected in similar fashion by the provision of other translation keys 652–N connected to other And gates 653–N. In this manner, any other functions in accordance with the received information may be performed in the television receiver. The unscrambling, or decoding, circuit may be set to continue operation until a second binary number is received and detected which performs a disabling function to the unscrambling-control circuits. The data thus detected may also be recorded as identification for the program being received and also may be employed to set up price demand information in an accompanying coinbox arrangement in the manner described in the patent to Gottfried et al. which has been mentioned previously. It should be apparent that the data transmitted need not be related to the video portion of the signal, but can also be employed for ordering the scrambling or not of the audio portion of the signal.

Accordingly, there has been described and shown herein a novel and useful system wherein an additional channel of communication is made available in a television transmission system. The transmitter equipped with a horizontal pulse-width modulation apparatus can send information which is either related to the transmission or is independent thereof, as desired. A receiver may receive and decode the transmitted pulse-width signals for the purpose of supplementing the transmitted information or for independent purposes, as desired.

I claim:

1. In a television picture transmission system of the type wherein transmitted horizontal-synchronizing signals are width modulated to be representative of additional information in a video transmission, a television receiver for said transmission including a pulse-width discriminator to which said width-modulated horizontal-synchronizing signals are applied, and decoding means coupled to receive output from said pulse-width discriminator and to provide an output representative of said additional information, said decoding means including a shift register, and a plurality of gates coupled to said register to sense the contents thereof.

2. In a television system of the type wherein a transmitter transmits to receivers a scrambled video accompanied by horizontal-synchronizing signals which are width modulated to represent the key code for said scrambled video, a television receiver having a pulse-width discriminator to which said width-modulated horizontal-synchronizing signals are applied, a decoding circuit coupled to receive output from said pulse-width discriminator, and means to unscramble said scrambled video responsive to said decoding circuit detecting said key code for said scrambled video.

3. In a subscription television system of the type wherein a television picture is scrambled at random intervals and transmitted together with horizontal-synchronizing signals to subscriber receivers equipped with unscrambling apparatus, means for transmitting keying information for unscrambling said televison picture including means to pulse-width modulate said horizontal-synchronizing signals with said keying information, means at a subscriber receiver to receive said pulse-width modulated synchronizing signals, means to convert said signals to keying information, and unscrambling apparatus operative responsive to the keying information from said pulse-width modulated synchronizing signals.

4. In a television transmitter, means to generate video signals representative of a picture, means to generate horizontal-synchronizing signals for said video signals, a random-pulse generator, means to alter the interrelations of said video signals responsive to pulses from said generator to effectuate scrambling of said picture, means to determine the width of said horizontal-synchronizing signals as one or the other of two values, means responsive to said pulses from said random-pulse generator to control said means to determine the widths of said horizontal-synchronizing signals to represent a desired binary number indicative of said picture being scrambled, means to control said means to determine the widths of said horizontal synchronizng signals to represent other binary numbers in the absence of said pulses from said random generator, and means to transmit said binary numbers.

5. In a television transmitter means to generate video signals representative of a picture, means to generate horizontal-synchronizing signals for said video signals, a random-pulse generator, means to alter the timing of said video signals responsive to pulses from said generator to effectuate scrambling of said picture, a shift register, means to apply said horizontal-synchronizing signals to advance said shift register, means to alter the width of said horizontal-synchronizing signals to be either of two widths responsive to output from said shift register, means to insert a key-code signal into said shift register responsive to said pulses from said random-pulse generator, means to insert other signals into said shift register when said picture is not being scrambled, and means to transmit said width-altered horizontal-synchronizing pulses.

References Cited in the file of this patent

UNITED STATES PATENTS

| | | |
|---|---|---|
| 2,502,213 | Fredendall et al. | Mar. 28, 1950 |
| 2,547,598 | Roschke | Apr. 3, 1951 |
| 2,550,821 | Kharbanda | May 1, 1951 |
| 2,563,684 | Lord | Aug. 7, 1951 |
| 2,570,188 | Aram et al. | Oct. 9, 1951 |
| 2,656,406 | Gray | Oct. 20, 1953 |
| 2,678,347 | Clothier | May 11, 1954 |

FOREIGN PATENTS

| | | |
|---|---|---|
| 621,479 | Great Britain | Apr. 11, 1949 |